US012646775B2

(12) United States Patent
Ryu et al.

(10) Patent No.: US 12,646,775 B2
(45) Date of Patent: Jun. 2, 2026

(54) BATTERY MODULE, BATTERY PACK COMPRISING THE SAME, AND VEHICLE

(71) Applicant: LG ENERGY SOLUTION, LTD., Seoul (KR)

(72) Inventors: Sang-Woo Ryu, Daejeon (KR); Jong-Hyun Jo, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 969 days.

(21) Appl. No.: 17/790,435

(22) PCT Filed: Nov. 15, 2021

(86) PCT No.: PCT/KR2021/016677
§ 371 (c)(1),
(2) Date: Jun. 30, 2022

(87) PCT Pub. No.: WO2022/108281
PCT Pub. Date: May 27, 2022

(65) Prior Publication Data
US 2023/0045395 A1     Feb. 9, 2023

(30) Foreign Application Priority Data
Nov. 23, 2020    (KR) ........................ 10-2020-0158073

(51) Int. Cl.
*H01M 50/211*      (2021.01)
*H01M 50/358*      (2021.01)
(52) U.S. Cl.
CPC ....... *H01M 50/211* (2021.01); *H01M 50/358* (2021.01); *H01M 2220/20* (2013.01)

(58) Field of Classification Search
CPC .. H01M 50/35; H01M 50/358; H01M 50/367; H01M 50/383; H01M 50/211; H01M 50/271
See application file for complete search history.

(56) References Cited

U.S. PATENT DOCUMENTS 3,789,906 A  *  2/1974  Viol ........................ E06B 3/481
                                                        160/199
2007/0262602 A1    11/2007  Nagle
                    (Continued)

FOREIGN PATENT DOCUMENTS

CN        206076341 U     4/2017
CN        113826276 A     12/2021
                    (Continued)

OTHER PUBLICATIONS

International Search Report for PCT/KR2021/016677 mailed on Feb. 24, 2022.

*Primary Examiner* — Keith Walker
*Assistant Examiner* — Jacky Yuen
(74) *Attorney, Agent, or Firm* — Birch, Stewart, Kolasch & Birch, LLP

(57) ABSTRACT

A battery module with enhanced stability against fire and explosion. The battery module includes a cell assembly having a plurality of secondary batteries, a lower case having an open top and having an accommodation space, an upper case coupled to the lower case to cover the open top of the lower case and having a connection hole perforated to communicate with the accommodation space; an upper cover coupled to the upper case to cover an upper portion of the upper case and configured to form a buffer space spaced apart from the upper case, the upper cover having a discharge hole perforated so that the buffer space communicates with the outside; and at least one partition member extending in a horizontal direction inside the buffer space to (Continued)

form a moving passage extending from the connection hole to the discharge hole and configured to have an adjustable extension length.

13 Claims, 7 Drawing Sheets

(56) References Cited

U.S. PATENT DOCUMENTS

| 2016/0093857 A1* | 3/2016 | DeKeuster | ............ H01M 50/35 |
| | | | 429/87 |
| 2019/0097192 A1 | 3/2019 | Kim et al. | |
| 2020/0067045 A1 | 2/2020 | Takano et al. | |
| 2022/0045396 A1 | 2/2022 | Tomita et al. | |
| 2022/0123428 A1 | 4/2022 | Wakabayashi et al. | |
| 2022/0311088 A1 | 9/2022 | Ryu et al. | |

FOREIGN PATENT DOCUMENTS

| CN | 110393875 A | 3/2026 |
| JP | 7-26224 U | 5/1995 |
| JP | 2011-70871 A | 4/2011 |
| JP | 2014-154381 A | 8/2014 |
| JP | 2014-160573 A | 9/2014 |
| JP | 2014-197512 A | 10/2014 |
| JP | 2015-133266 A | 7/2015 |
| JP | 2016-201333 A | 12/2016 |
| JP | 2020-87607 A | 6/2020 |
| KR | 10-2015-0095158 A | 8/2015 |
| KR | 10-2017-0090261 A | 8/2017 |
| KR | 10-2019-0036260 A | 4/2019 |
| KR | 10-1998224 B1 | 7/2019 |
| WO | WO 2018/123573 A1 | 7/2018 |
| WO | WO 2020/153018 A1 | 7/2020 |

* cited by examiner

BATTERY MODULE, BATTERY PACK COMPRISING THE SAME, AND VEHICLE

TECHNICAL FIELD

The present disclosure relates to a battery module, a battery pack comprising the same and a vehicle, and more particularly, to a battery module with enhanced stability against fire and explosion.

The present application claims priority to Korean Patent Application No. 10-2020-0158073 filed on Nov. 23, 2020, in the Republic of Korea, the disclosures of which are incorporated herein by reference.

BACKGROUND ART

Recently, with the rapid increase in demand for portable electronic products such as laptop computers, video cameras and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

The lithium secondary battery mainly uses lithium-based oxide and carbon material as a positive electrode active material and a negative electrode active material, respectively. In addition, this lithium secondary battery includes an electrode assembly in which a positive electrode plate and a negative electrode plate respectively coated with the positive electrode active material and the negative electrode active material are disposed with a separator interposed therebetween, and an exterior, namely a battery case, for hermetically accommodating the electrode assembly together with an electrolyte.

In addition, depending on the shape of the exterior, lithium secondary batteries may be classified into a can-type secondary battery in which the electrode assembly is included in a metal can and a pouch-type secondary battery in which the electrode assembly is included in a pouch made of an aluminum laminate sheet.

In particular, the demand for large-capacity battery modules applied to electric vehicles and the like is increasing recently. The large-capacity battery module includes a plurality of secondary batteries, and thus, when a fire or explosion occurs in some of the plurality of secondary batteries, flames and high-temperature gas are discharged to propagate fire to other adjacent battery modules in the vehicle due to explosion, damage other neighboring instruments or passengers. Accordingly, there is a need for a method to increase the stability against fire or gas explosion of the battery module.

DISCLOSURE

Technical Problem

The present disclosure is designed to solve the problems of the related art, and therefore the present disclosure is directed to providing a battery module with enhanced stability against fire and explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:

a cell assembly having a plurality of secondary batteries;

a lower case having an open top and having an accommodation space in which the cell assembly is accommodated;

an upper case coupled to the lower case to cover the open top of the lower case and having a connection hole communicating with the accommodation space;

an upper cover coupled to the upper case to cover an upper portion of the upper case and configured to form a buffer with the upper case, the upper cover having a discharge hole so that the buffer space communicates with the outside; and at least one partition member extending in a horizontal direction inside the buffer space to form a moving passage extending from the connection hole to the discharge hole, the at least one partition member configured to have an adjustable extension length.

Also, the at least one partition member may include at least two barriers configured to be disposed to overlap with each other or be partially separated from each other and extending in a horizontal direction, and ends of the at least two barriers may be hinged with each other, and at least one of the at least two barriers may have a coupling space formed to accommodate another barrier.

Moreover, the at least one partition member may include:

a first barrier having two sides extending in the horizontal direction and spaced apart from each other by a predetermined distance so that extended ends of the two sides are connected with each other, and a first coupling space formed between the two sides and opened in upper and lower directions;

a second barrier having an extended end hinged to an end of the first barrier unit and configured to be inserted into the first coupling space between the two sides of the first barrier unit by hinge rotation, the second barrier having a second coupling space formed to accommodate another barrier; and a third barrier having an extended end hinged to an end of the second barrier unit and configured to be inserted into the second coupling space between the two sides of the second barrier by hinge rotation.

In addition, at least one of the upper cover and the upper case may have an insert groove configured so that the extended ends of the first barrier are inserted therein.

Also, the at least one partition member may have a fixing protrusion protruding upward or downward, and at least one of the upper cover and the upper case may have a fixing groove configured so that the fixing protrusion is inserted therein.

Moreover, at least one of the upper cover and the upper case may have a mounting groove configured so that an upper portion or a lower portion of the at least one partition member is inserted therein.

In addition, the at least two barriers may be configured to be exposed above the mounting groove by a same height.

Also, at least two partition members may be provided, and a first partition member among the at least two partition members may be disposed to be biased toward a first side of the buffer space with respect to a center, and a second partition member among the at least two partition members may be disposed to be biased toward a second side of the buffer space.

Moreover, in another aspect of the present disclosure, there is also provided a battery pack, comprising at least one battery module as above.

In addition, in another aspect of the present disclosure, there is also provided a vehicle, comprising at least one battery pack as above.

Advantageous Effects

According to an embodiment of the present disclosure, in the present disclosure, since the buffer space is formed inside by the upper cover and the upper case and also the partition member forms a moving passage in the buffer space, when the plurality of secondary batteries of the cell assembly of the battery module explodes or ignites, the generated flame may be extinguished by itself while moving along the moving passage of the buffer space, and the gas pressure and gas temperature may drop significantly while the gas generated passes through the moving passage of the buffer space. Ultimately, the battery module may effectively reduce external damage caused by explosion or fire of the plurality of secondary batteries. Accordingly, the present disclosure may significantly increase the safety of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 2 is an exploded perspective view schematically showing some components of the battery module according to an embodiment of the present disclosure.

FIG. 11 is a perspective view schematically showing some components of a battery module according to still another embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
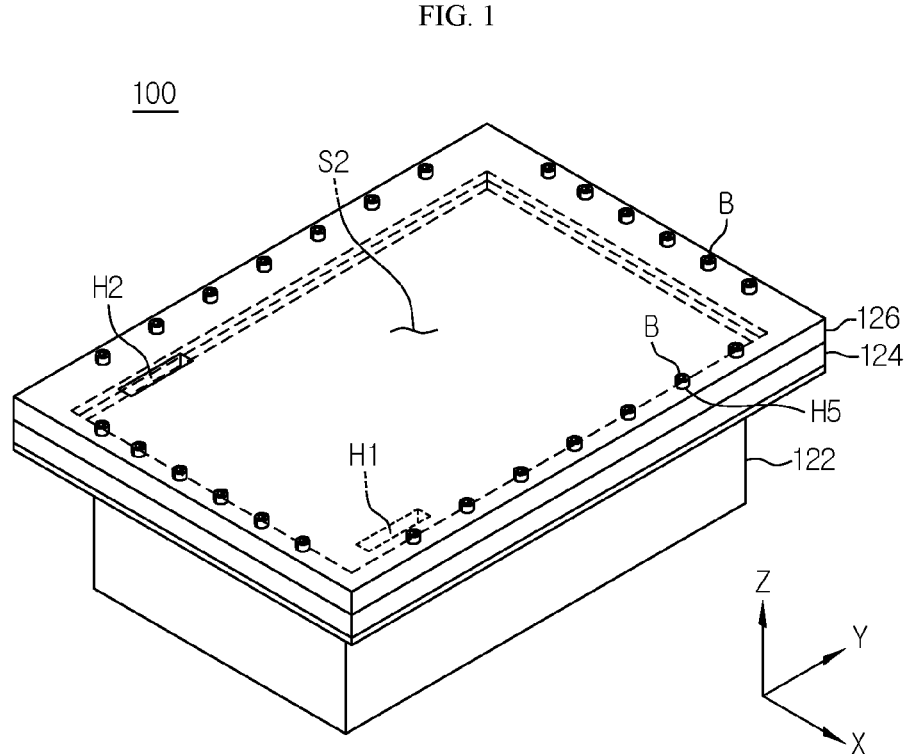
FIG. 1 is a perspective view schematically showing a battery module according to an embodiment of the present disclosure.
Figure 2:
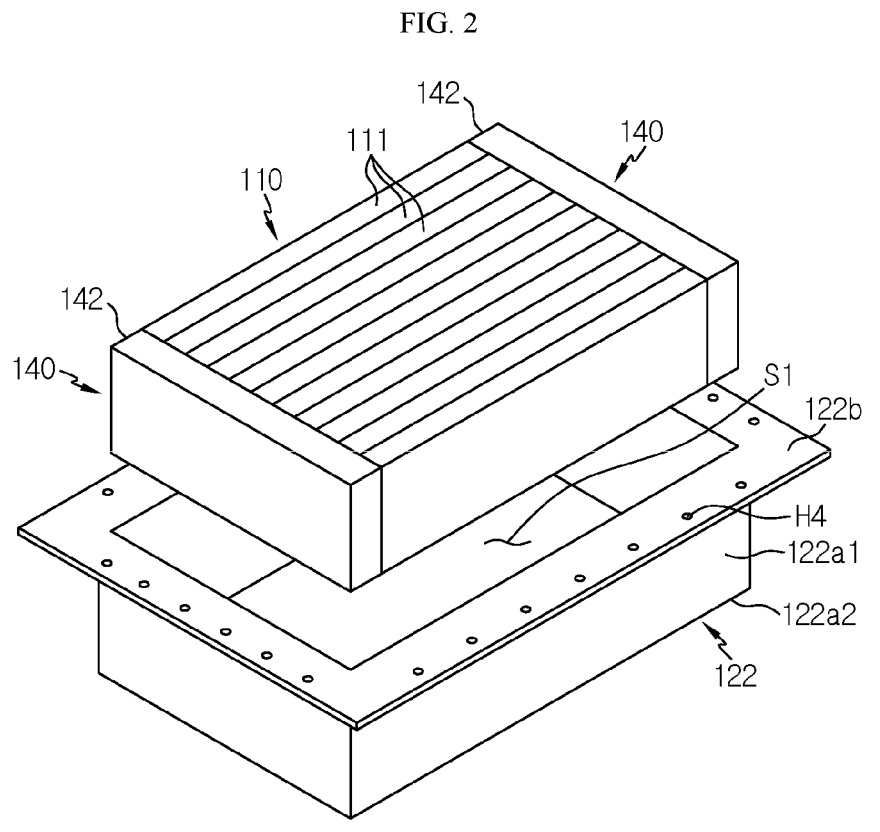
Figure 3:
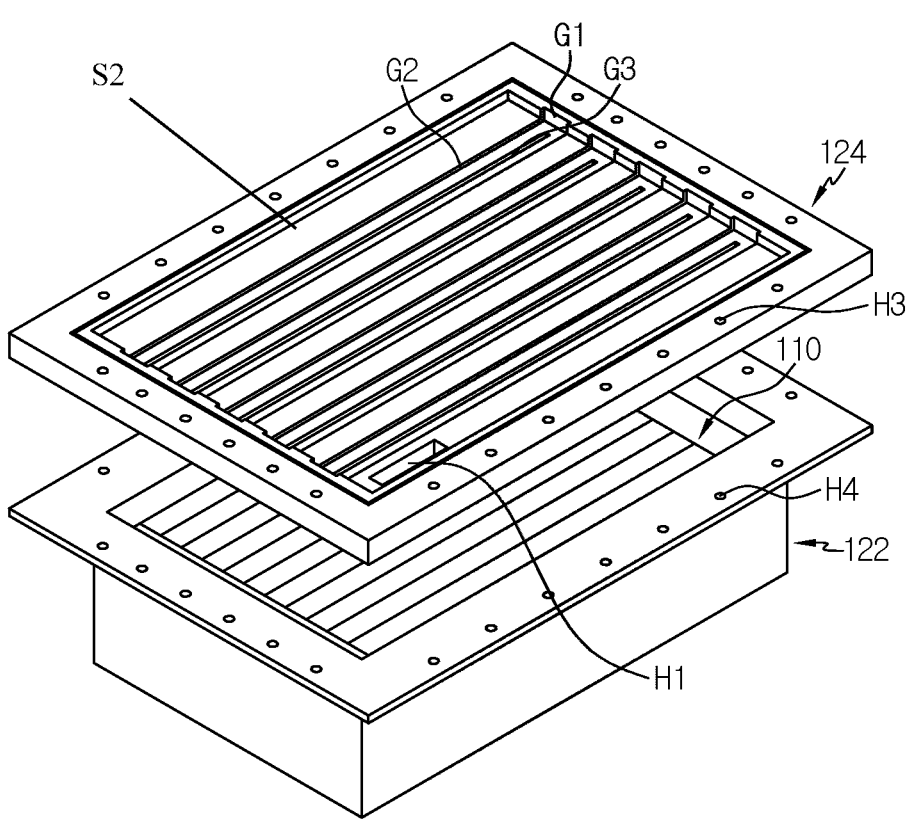
FIG. 3 is an exploded perspective view schematically showing some components of the battery module according to an embodiment of the present disclosure.
Figure 4:
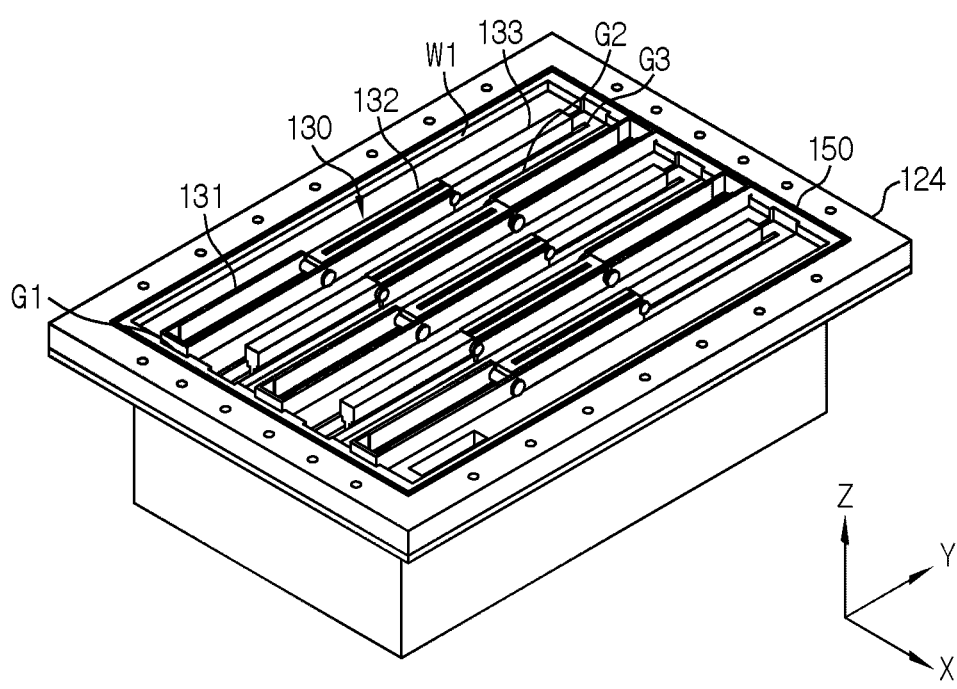
FIG. 4 is a perspective view schematically showing some components of the battery module according to an embodiment of the present disclosure.

FIG. 1 is a perspective view schematically showing a battery module according to an embodiment of the present disclosure. FIG. 2 is an exploded perspective view schematically showing some components of the battery module according to an embodiment of the present disclosure. FIG. 3 is an exploded perspective view schematically showing some components of the battery module according to an embodiment of the present disclosure. Also, FIG. 4 is a perspective view schematically showing some components of the battery module according to an embodiment of the present disclosure. In FIG. 1, front and rear directions are expressed in a negative direction and a positive direction of the Y axis, left and right directions are expressed in a negative direction and a positive direction of the X axis, and upper and lower directions are expressed in a positive direction and a negative direction of the Z axis.

Referring to FIGS. 1 to 4, a battery module 100 according to an embodiment of the present disclosure includes a cell assembly 110 having a plurality of secondary batteries 111, a lower case 122, an upper case 124, an upper cover 126, and at least one partition member 130.

Specifically, the secondary battery 111 may be, for example, a pouch-type secondary battery 111. For example, as shown in FIG. 3, the cell assembly 110 may include 21 pouch-type secondary batteries 111 stacked side by side in one direction (X-axis direction). For example, the pouch-type secondary battery 111 may have electrode leads (not shown) provided at front and rear ends thereof, respectively. For example, the pouch-type secondary battery 111 may include a positive electrode lead at the front end and a negative electrode lead at the rear end.

However, in the battery module 100 according to the present disclosure, the configuration of the secondary battery 111 is not limited to the pouch-type secondary battery 111 described above, and various types of secondary batteries known at the time of filing of this application may be employed.

In addition, the bus bar assembly 140 may be provided to each of the front side and the rear side of the cell assembly 110. The bus bar assembly 140 may be configured to electrically connect the plurality of secondary batteries 111. For example, the bus bar assembly 140 may include a bus bar (not shown) configured to contact the electrode leads of the plurality of secondary batteries 111, and a bus bar frame 142 configured to mount the bus bar. The bus bar, for example, may be made of a metal such as aluminum, copper, nickel. The bus bar frame 142 may be made of an electrically insulating material, for example. The electrically insulating material may be, for example, polyvinyl chloride.

Moreover, the lower case 122 may have an accommodation space S1 in which the cell assembly 110 is accommodated. That is, the lower case 122 may have a rectangular box shape with an open top. For example, as shown in FIG. 2, the lower case 122 may include a sidewall 122a1 provided in a horizontal direction to form an accommodation space S1 of a size corresponding to the cell assembly 110, and a lower wall 122a2 coupled to a lower portion of the sidewall 122a1. The lower case 122 may include a flange portion 122b extending in the horizontal direction from an upper end of the sidewall 122a1. The flange portion 122b may have a plurality of second bolt holes H4 formed at predetermined intervals along the outer periphery. The flange portion 122b may be configured to be bolted to the upper case 124 through the second bolt hole H4 by using a fastening bolt.

In addition, the upper case 124 may have a plate shape extending in the horizontal direction to cover the open top of the lower case 122. The upper case 124 may be configured to be coupled to the flange portion 122b of the lower case 122. To this end, the upper case 124 may have a plurality of first bolt holes H3 formed at the outer periphery in the horizontal direction. The upper case 124 may also be configured to be coupled to the upper cover 126. The upper case 124 may include a gasket 150 at an upper portion thereof. The gasket 150 may be configured to prevent gas from escaping to the outside through the coupling surface between the upper case 124 and the upper cover 126. That is, the gasket 150 may be interposed between the upper case 124 and the upper cover 126.

Further, the upper cover 126 may have a plate shape extending in the horizontal direction to cover the upper portion of the upper case 124. A plurality of third bolt holes H5 spaced apart from each other at a predetermined interval may be formed in the outer periphery of the upper cover 126 in the horizontal direction.

For example, as shown in FIG. 1, the upper cover 126 may be coupled to the upper portion of the upper case 124, and the lower portion of the upper case 124 may be coupled to the flange portion 122b of the lower case 122. At this time, the plurality of bolts B may penetrate through the third bolt hole H5 of the upper cover 126, the first bolt hole H3 of the upper case 124, and the bolt holes H4 of the lower case 122, respectively. The bolt B may be screwed into the bolt holes H3, H4, H5. Alternatively, the bolt B may be inserted into the bolt holes H3, H4, H5, and then fastened and fixed by inserting a nut into the lower portion thereof.

Figure 5:
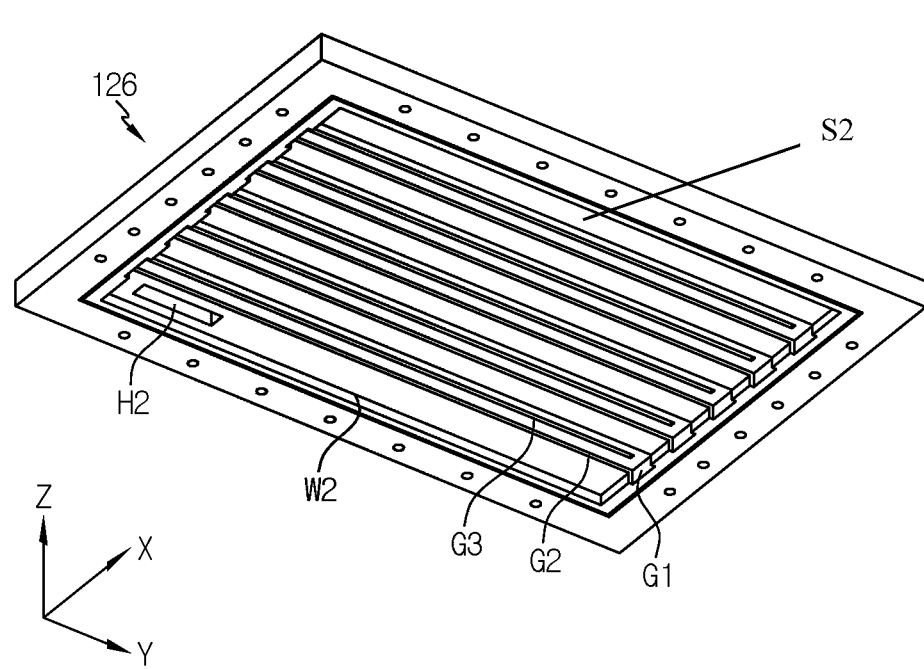
FIG. 5 is a bottom perspective view schematically showing an upper cover of the battery module according to an embodiment of the present disclosure.

FIG. 5 is a bottom perspective view schematically showing an upper cover of the battery module according to an embodiment of the present disclosure.

Referring to FIG. 5 along with FIGS. 1 to 4, the upper case 124 may have a connection hole H1 by perforating a part thereof to communicate with the accommodation space S1. The lower case 122 may form a buffer space S2 spaced apart from the upper case 124. For example, the buffer space S2 may be formed by inwardly recessing one surface of at least one of the upper case 124 and the upper cover 126 facing each other. For example, to form the buffer space S2, a part of the lower surface of the upper cover 126 may have a recessed portion W2 recessed upward, and a part of the upper surface of the upper case 124 may have a recessed portion W2 recessed downward.

In addition, the upper cover 126 may have a discharge hole H2 formed by perforating a part thereof so that the buffer space S2 communicates with the outside. That is, in the battery module 100 of the present disclosure, when thermal runaway or fire occurs in the cell assembly 110 to generate gas from the cell assembly 110, the generated gas may be introduced from the accommodation space S1 into the buffer space S2 through the connection hole H1 of the upper case 124. The gas introduced into the buffer space S2 may be discharged to the outside through the discharge hole H2 of the upper cover 126.

Moreover, the buffer space S2 may include at least one partition member 130. The partition member 130 may be configured to form a moving passage extending from the connection hole H1 to the discharge hole H2 in the buffer space S2. That is, the partition member 130 may be configured to partition the buffer space S2. The partition member 130 may have a shape extending in the horizontal direction in the buffer space S2. For example, as shown in FIG. 4, five partition members 130 may have a shape extending in the front and rear directions. That is, the partition member 130 may be configured to prevent the gas from moving in the left and right directions (X-axis direction) and to induce the gas to move in the front and rear directions (Y-axis direction).

In addition, the partition member 130 may be configured to adjust the extension length. For example, the partition member 130 may adjust the extension length in the front and rear directions (Y-axis direction) according to the set length of the moving passage in the front and rear directions.

Therefore, according to this configuration of the present disclosure, in the present disclosure, since the buffer space S2 is formed inside by the upper cover 126 and the upper case 124 and also the partition member 130 forms a moving passage in the buffer space S2, when the plurality of secondary batteries 111 of the cell assembly 110 of the battery module 100 explodes or ignites, the generated flame may be extinguished by itself while moving along the moving passage of the buffer space S2, and the gas pressure and gas temperature may drop significantly while the gas generated passes through the moving passage of the buffer space S2. That is, in the present disclosure, without a partition member of the prior art, it is possible to reduce the damage to an external device or human life that may occur when a high-temperature gas or flame is directly discharged from the battery module. Ultimately, the battery module 100 may effectively reduce external damage caused by explosion or fire of the plurality of secondary batteries 111. Accordingly, the present disclosure may significantly increase the safety of the battery module 100.

Referring to FIGS. 3 and 4 again, the partition member 130 may include at least two barrier units 131, 132, 133. Specifically, some barrier units 132, 133 of the at least two barrier units 131, 132, 133 may be coupled to overlap with each other. Alternatively, some barrier unit 131 of the at least two barrier units 131, 132, 133 may be disposed to be partially separated from other barrier units 132, 133. That is, when the moving passage is lengthened as necessary, the at least two barrier units 131, 132, 133 may be disposed in the buffer space S2 so that the overlapping parts of the at least two barrier units 131, 132, 133 are separated from each other. When the moving passage is shortened as necessary, the at least two barrier units 131, 132, 133 may be disposed in the buffer space S2 so that the at least two barrier units 131, 132, 133 are coupled to overlap with each other.

In addition, ends of the at least two barrier units 131, 132, 133 may be hinged to each other. For example, as shown in FIG. 4, the partition member 130 may include three barrier units 131, 132, 133. Each of the three barrier units 131, 132, 133 may be configured to enable hinge rotation. One end or both ends of each of the three barrier units 131, 132, 133 may form a hinge-coupling structure 134 with another barrier unit. The hinge-coupling structure 134 may include a through hole formed in the barrier unit 131 and a pillar portion inserted into the through hole.

Moreover, at least one of the at least two barrier units 131, 132, 133 may have a coupling space S3 formed so that another barrier unit is accommodated therein. That is, in the coupling space S3 of at least one of the at least two barrier units 131, 132, 133, other barrier units may be inserted to overlap with each other. At this time, other barrier units 132 may be inserted into the coupling space S3 of the barrier unit 131 by hinge rotation.

Therefore, according to this configuration of the present disclosure, in the present disclosure, since the partition member 130 is disposed so that barrier units 131, 132, 133 overlap with each other or partially separated from each other, when the battery module 100 explodes, the number of barrier units in the partition member 130 and the extended length of the partition member 130 may be adjusted depending on the gas pressure. That is, when the gas pressure of the explosion of the battery module 100 is relatively large, the at least two barrier units 131, 132, 133 of the partition member 130 may be arranged to overlap with each other, and a larger number of barrier units of the partition member 130 may be disposed in the buffer space S2. Conversely, when the gas pressure of the explosion of the battery module 100 is relatively small, the at least two barrier units 131, 132, 133 of the partition member 130 may be arranged to be partially separated and arranged longer, and a smaller number of barrier units of the partition member 130 may be arranged in the buffer space S2.

Accordingly, in the battery module 100 of the present disclosure, a moving passage along which gas or flame moves may be easily set in consideration of the capacity or explosion characteristics of the applied cell assembly 110, there is no need to manufacture a new battery module 100 whenever it is necessary to change the capacity of the cell assembly 110, which makes it possible to reduce the manufacturing cost and is easy to standardize the partition member 130. Further, when it is required to store components before manufacturing the battery module 100, the partition member 130 may accommodate the plurality of barrier units 131, 132, 133 to overlap with each other, thereby effectively reducing the storage space.

Figure 6:
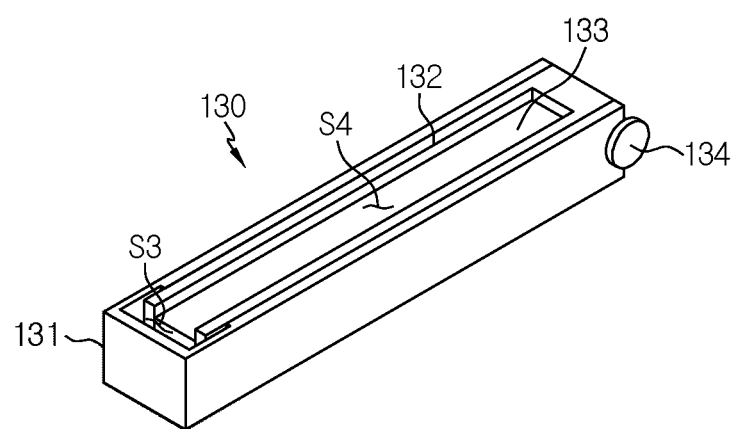
FIG. 6 is a perspective view schematically showing a partition member of the battery module according to an embodiment of the present disclosure.
Figure 7:
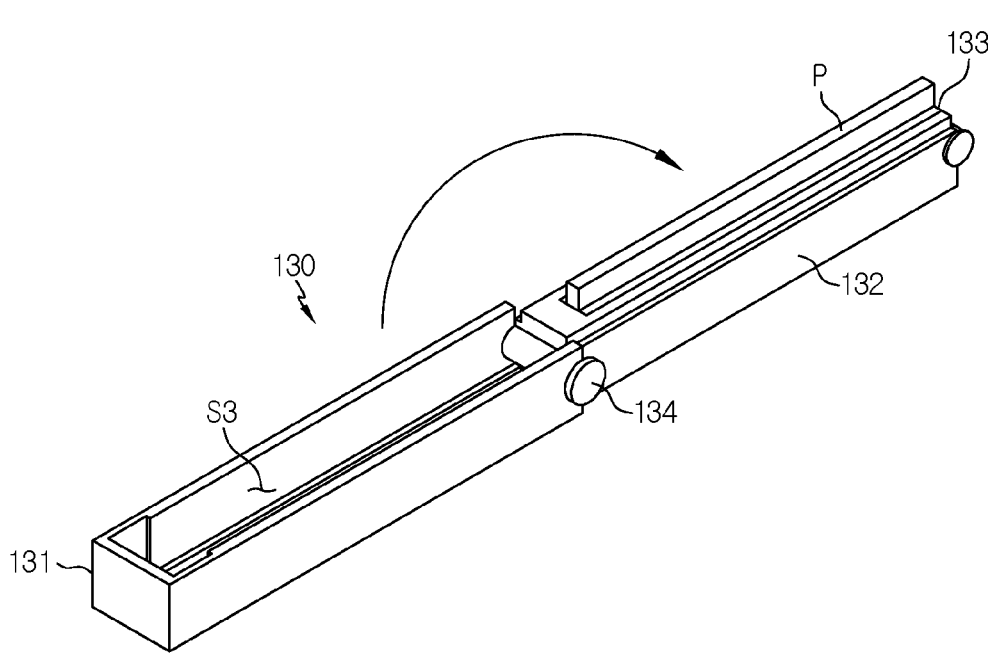
FIG. 7 is a perspective view schematically showing another example of the partition member of the battery module according to an embodiment of the present disclosure.

FIG. 6 is a perspective view schematically showing a partition member of the battery module according to an embodiment of the present disclosure. FIG. 7 is a perspective view schematically showing another example of the partition member of the battery module according to an embodiment of the present disclosure. Also, FIG. 8 is a perspective view schematically showing still another example of the partition member of the battery module according to an embodiment of the present disclosure.

Figure 8:
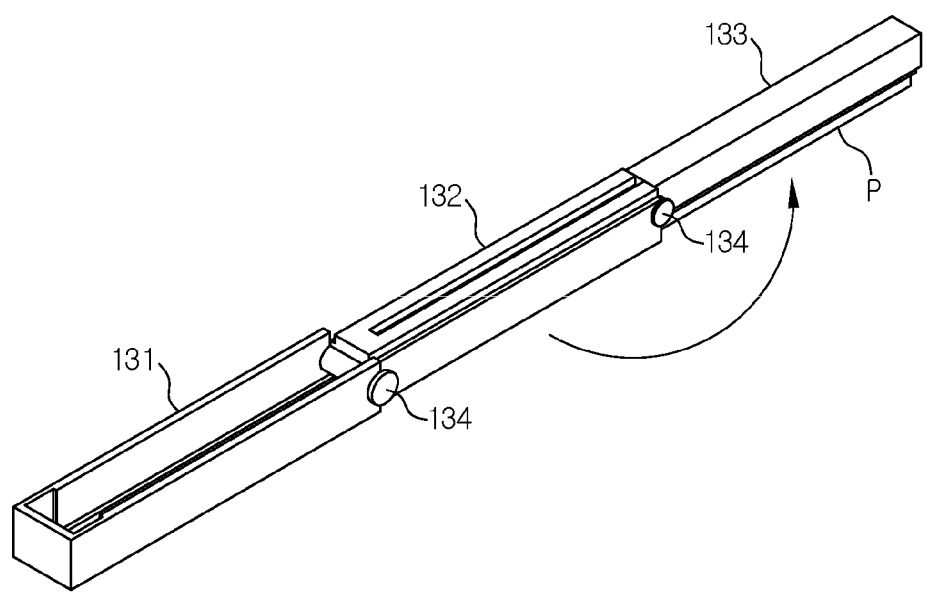
FIG. 8 is a perspective view schematically showing still another example of the partition member of the battery module according to an embodiment of the present disclosure.

Referring to FIGS. 6 to 8, the partition member 130 may include a first barrier unit 131, a second barrier unit 132, and a third barrier unit 133. The first barrier unit 131 may have both side portions extending in the horizontal direction and spaced apart from each other by a predetermined distance. The first barrier unit 131 may have a shape in which extended ends of both side portions are connected to each other. The first barrier unit 131 may have a first coupling space S3 opened in upper and lower directions between both side portions. The first coupling space S3 may be a space in which the second barrier unit 132 is accommodated. The second barrier unit 132 may be moved based on the hinge and inserted into the first coupling space S3.

Also, an extended end of the second barrier unit 132 may be hinge-coupled to the end of the first barrier unit 131. That is, the second barrier unit 132 may form a hinge-coupling structure 134 with the first barrier unit 131. The second barrier unit 132 may be configured to be inserted into the first coupling space S3 formed between both side portions of the first barrier unit 131. That is, the second barrier unit 132 may be rotated based on the hinge and inserted into the first coupling space S3. Alternatively, the second barrier unit 132 may come out of the first coupling space S3 by rotating based on the hinge. The second barrier unit 132 may have a second coupling space S4 for accommodating another barrier unit 133. For example, the second barrier unit 132 may have a second coupling space S4 for accommodating the third barrier unit 133 therein.

Moreover, an extended end of the third barrier unit 133 may be hinge-coupled to the end of the second barrier unit 132. The third barrier unit 133 may form a hinge-coupling structure 134 with the second barrier unit 132. The third barrier unit 133 may be configured to be inserted into the second coupling space S4 formed between both side portions of the second barrier unit 132. The third barrier unit 133 may be rotated based on the hinge and inserted into the second coupling space S4. The third barrier unit 133 may come out of the second coupling space S4 by rotating based on the hinge.

Referring to FIGS. 3 to 5 again, an insert groove G1 may be formed in at least one of the upper cover 126 and the upper case 124 of the battery module 100 of the present disclosure. The insert groove G1 may be configured such that the extended end of the barrier unit 133 is inserted therein. For example, as shown in FIGS. 3 and 4, the insert groove G1 recessed rearward or forward may be formed in a recessed portion W1 of the upper case 124. In the insert groove G1, the extended end of the third barrier unit 133 may be inserted.

Also, for example, as shown in FIG. 5, an insert groove G1 recessed rearward or forward may be formed in the recessed portion W2 of the upper cover 126. In the insert groove G1, the extended end of the first barrier unit 131 or the third barrier unit 133 may be inserted.

Therefore, according to this configuration of the present disclosure, in the present disclosure, since the insert groove G1 is formed, it is possible to fix the end of the partition member 130 in the left and right directions. Accordingly, when the battery module 100 is internally exploded, it is possible to effectively prevent the partition member 130 from being separated from the original position due to the generated gas pressure.

Meanwhile, referring to FIGS. 3 to 5 again, at least one of the upper cover 126 and the upper case 124 may have a mounting groove G2 configured so that an upper portion or a lower portion of the barrier unit 131 is inserted therein. For example, as shown in FIG. 5, a recessed portion forming the buffer space S2 is formed in the upper direction of the upper cover 126, and a mounting groove G2 recessed upward with a size corresponding to the upper portion of the barrier unit 131 is formed in the recessed portion. The mounting groove G2 may be elongated in the front and rear directions from the recessed portion forming the buffer space S2. Five mounting grooves G2 may be formed side by side in the left and right directions. The barrier unit 131 may set the position on the mounting groove G2 according to the moving passage to be set. For example, the upper portions of the first barrier unit 131, the second barrier unit 132 and the third barrier unit 133 may be inserted into the mounting grooves G2 of the upper cover 126.

Also, for example, as shown in FIG. 3, a recessed portion is provided to form the buffer space S2 in the lower direction of the upper case 124, and a mounting groove G2 recessed downward with a size corresponding to the lower portion of the barrier unit 131 may be formed in the recessed portion. The mounting groove G2 may have a shape elongated from the recessed portion in the front and rear directions. Five mounting grooves G2 may be formed side by side in the left and right directions. The barrier unit 131 may set the position on the mounting groove G2 according to the moving passage to be set. For example, the lower portions of the first barrier unit 131, the second barrier unit 132 and the third barrier unit 133 may be inserted into the mounting grooves G2 of the upper case 124.

Therefore, according to this configuration of the present disclosure, in the present disclosure, since the mounting groove G2 is formed, the end of the partition member 130 may be fixed in the left and right directions. Accordingly, when the battery module 100 is internally exploded, it is possible to effectively prevent the partition member 130 from being separated from the original position due to the generated gas pressure.

Meanwhile, referring to FIGS. 6 to 8 again, in the present disclosure, the partition member 130 may have a fixing protrusion P protruding upward or downward. The fixing protrusion P may have a shape elongated in the front and rear directions on a plane. For example, as shown in FIG. 6, when the first barrier unit 131, the second barrier unit 132 and the third barrier unit 133 of the partition member 130 are disposed to overlap with each other, the fixing protrusion (not shown in FIG. 6) may be positioned to protrude downward further to the lower portion of the first barrier unit 131. For example, as shown in FIG. 7, when the second barrier unit 132 and the third barrier unit 133 are separated from the first barrier unit 131 of the partition member 130 and are overlapped with each other, the fixing protrusion P may be positioned to protrude upward further to the upper portion of the second barrier unit 132. For example, as shown in FIG. 8, when the first barrier unit 131, the second barrier unit 132 and the third barrier unit 133 of the partition member 130 are partially separated from each other and disposed in an unfolded form, the fixing protrusion P may be positioned to protrude downward from the third barrier unit 133. For example, the fixing protrusion P may be formed on the third barrier unit 133.

Meanwhile, referring to FIGS. 3 to 5 again, at least one of the upper cover 126 and the upper case 124 may have a fixing groove G3 configured so that the fixing protrusion P is inserted therein. The fixing groove G3 may have, for example, a shape elongated in the front and rear directions on a plane. The fixing groove G3 may be formed to be recessed upward or downward further to the inner surface of the mounting groove G2. For example, a G3 fixing groove recessed upward further to the inner surface of the mounting groove G2 may be formed in the upper cover 126. For example, a fixing groove G3 recessed downward further to the inner surface of the mounting groove G2 may be formed in the upper case 124. The fixing protrusion P may change the position in the front and rear directions on the fixing groove G3 according to the set moving passage.

Therefore, according to this configuration of the present disclosure, in the present disclosure, since the fixing protrusion P is provided to the partition member 130 and the fixing groove G3 is formed in at least one of the upper cover 126 and the upper case 124, the upper portion or the lower portion of the partition member 130 may be fixed in the left and right directions. Accordingly, when the battery module 100 is internally exploded, it is possible to effectively prevent the partition member 130 from being separated from the original position due to the generated gas pressure.

Figure 9:
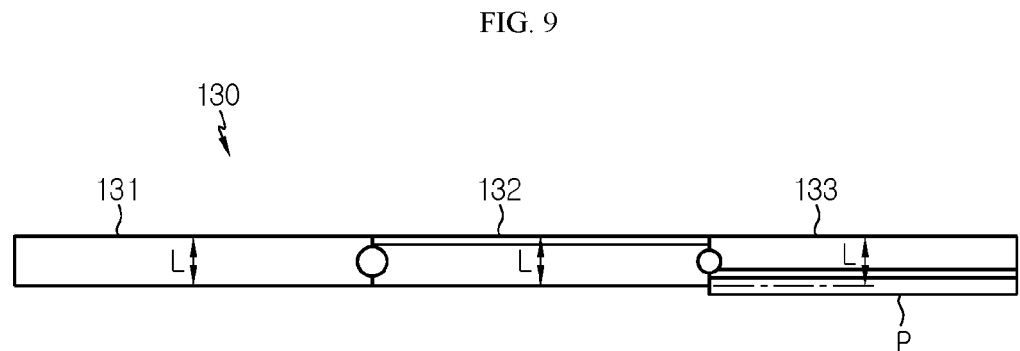
FIG. 9 is a side view schematically showing still another example of the partition member of the battery module according to an embodiment of the present disclosure.
Figure 9:

FIG. 9 is a side view schematically showing still another example of the partition member of the battery module according to an embodiment of the present disclosure.

Referring to FIG. 9 along with FIGS. 4 and 8, the partition member 130 of the battery module 100 according to an embodiment of the present disclosure may be exposed to the outside from the mounting groove G2 of each of the at least two barrier units 131, 132, 133 by the same height L. That is, the at least two barrier units 131, 132, 133 may be configured such that the remaining portions exposed from the mounting groove G2 of the partition member 130 have the same height L in a state where they are mounted in the mounting groove G2. For example, as shown in FIG. 9, the partition member 130 may be configured such that the heights L of the first barrier unit 131, the second barrier unit 132 and the third barrier unit 133 exposed to the outside from the mounting groove G2 may be the same. That is, even though the third barrier unit 133 has the fixing protrusion P protruding downward, the fixing protrusion P is inserted into the fixing groove G3 formed in the inner surface of the mounting groove G2, and thus the height L is exposed to the outside from the mounting groove G2 of the third barrier unit 133 may be the same as those of the first barrier unit 131 and the second barrier unit 132.

Therefore, according to this configuration of the present disclosure, in the present disclosure, since the at least two barrier units 131, 132, 133 are configured to be exposed to the outside from the mounting groove G2 by the same height L, when the battery module 100 is internally exploded, it is possible to guide the generated gas or flame to move along the set moving passage without leaking to the upper portion or the lower portion of the partition member 130. Accordingly, the battery module 100 of the present disclosure may effectively reduce the extent to which the generated gas or flame is ejected to the outside.

Meanwhile, referring to FIG. 4 again, in the present disclosure, at least two partition members 130 may be included. For example, as shown in FIG. 4, the battery module 100 of the present disclosure may include five partition members 130. In addition, any one partition member 130 among the at least two partition members 130 may be disposed to be biased to one side of the buffer space S2 with respect to the center, and the remaining partition member 130 may be disposed to be biased to the other side of the buffer space S2. In other words, when the moving passage of the buffer space S2 is set in a zig-zag form, in the battery module 100, one partition member 130 may be disposed to be biased to one end of the buffer space S2 to form a passage through which flame or gas may pass to the other end of the buffer space S2, and another adjacent partition member 130 may be disposed to be biased toward the other end of the buffer space S2 to form a passage through which gas or flame may pass to one end of the buffer space S2.

For example, as shown in FIG. 4, among the five partition members 130, the partition member 130 disposed at the rightmost side may be disposed to be biased toward the front end of the recessed portion of the upper case 124 forming the buffer space S2, the left partition member 130 adjacent to the partition member 130 disposed at the rightmost side may be disposed to be biased toward the rear end of the recessed portion of the upper case 124 forming the buffer space S2 conversely, the partition member 130 disposed at the center in the left and right directions may be disposed to be biased toward the front end of the recessed portion of the upper case 124, the left partition member 130 adjacent to the disposed partition member 130 disposed at the center may be disposed to be biased toward the rear end of the recessed portion of the upper case 124 forming the buffer space S2 conversely, and the partition member 130 disposed at the leftmost end may be disposed to be biased toward the front end of the recessed portion of the upper case 124.

Therefore, in the present disclosure, since the moving passage is formed in a zig-zag shape in the front and rear directions using a plurality of partition members 130, the moving passage may be effectively formed long, so that while the generated gas or passes through the moving passage, the gas pressure may be reduced, and the intensity of the flame may also be effectively reduced. Accordingly, even if a fire or explosion occurs in the battery module 100 of the present disclosure, it is possible to effectively reduce damage caused by gas or flame discharged to the outside.

Figure 10:
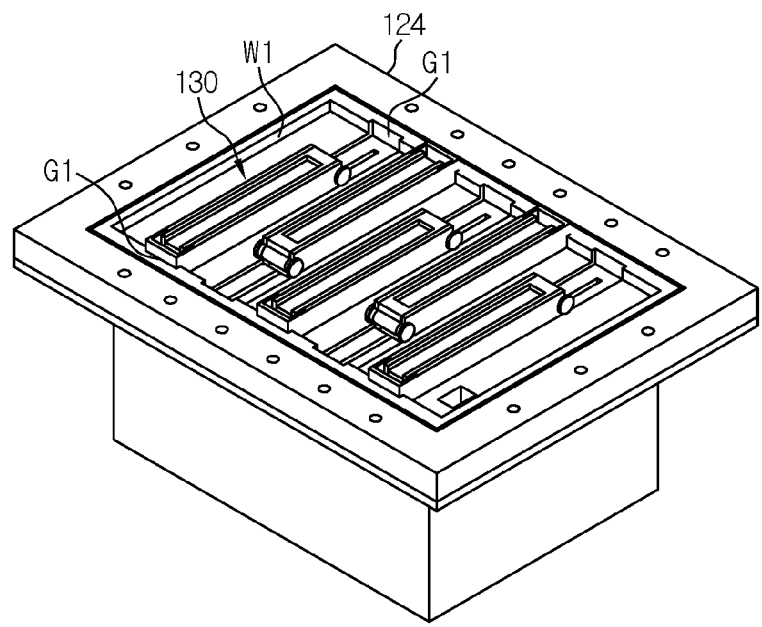
FIG. 10 is a perspective view schematically showing some components of a battery module according to another embodiment of the present disclosure.

FIG. 10 is a perspective view schematically showing some components of a battery module according to another embodiment of the present disclosure.

Referring to FIG. 10 along with FIG. 6, the battery module 100 according to another embodiment of the present disclosure is applied in a case where it has a smaller size than the battery module 100 of FIG. 1 or where a high gas pressure is exerted during explosion, and the first barrier unit 131, the second barrier unit 132 and the third barrier unit 133 of the partition member 130 may be all disposed to overlap with each other. For example, five partition members 130 may be mounted in the recessed portion W1 of the upper case 124 to form a moving passage having a zigzag shape in the front and rear directions. In this case, the five partition members 130 may be arranged such that their ends are alternately inserted into the insert grooves G1 formed at the front or the insert grooves G1 formed at the rear.

Figure 11:
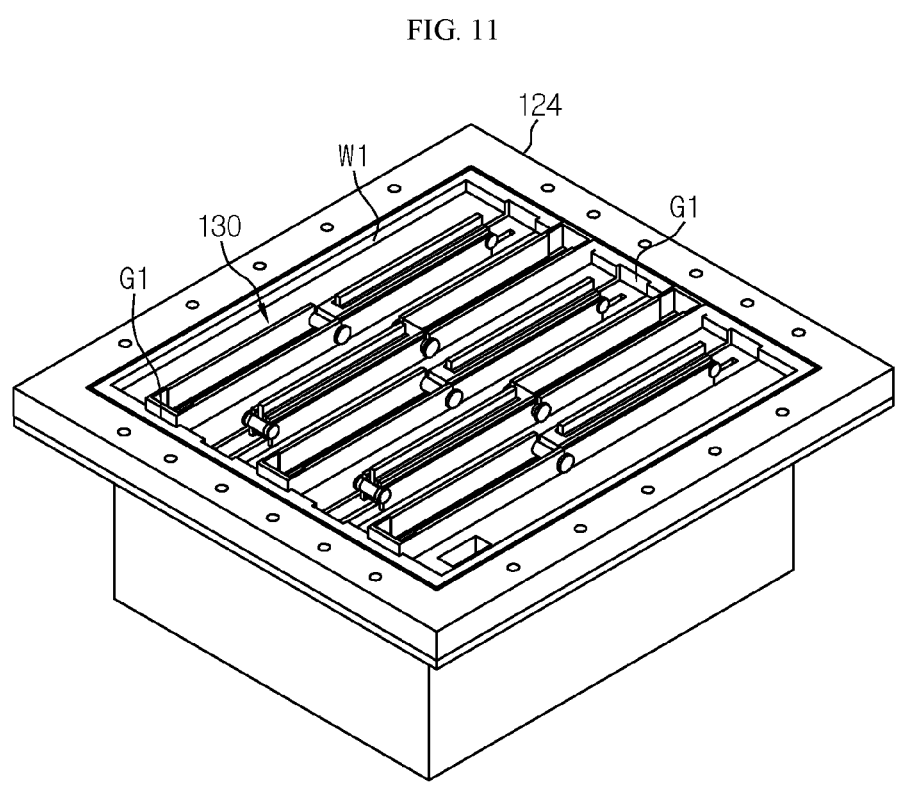

FIG. 11 is a perspective view schematically showing some components of a battery module according to still another embodiment of the present disclosure.

Referring to FIG. 11 along with FIG. 7, the battery module 100 according to another embodiment of the present disclosure is applied in a case where it has a smaller size than the battery module 100 of FIG. 1 but a larger size than the battery module 100 of FIG. 10 or where a lower gas pressure is exerted during explosion than compared to the case of the battery module 100 of FIG. 10, and in the partition member 130, the second barrier unit 132 and the third barrier unit 133 may be disposed to overlap with each other, and the second barrier unit 132 and the third barrier unit 133 may be disposed to be partially separated from the first barrier unit 131. For example, the five partition members 130 may be mounted in the recessed portion W1 of the upper case 124 to form a moving passage of a zigzag shape in the front and rear directions. In this case, the five partition members 130 may be arranged such that their ends are alternately inserted into the insert grooves G1 formed at the front or the insert grooves G1 formed at the rear.

Meanwhile, a battery pack according to an embodiment of the present disclosure includes at least one battery module 100 as above.

In addition, the battery pack may further include various devices (not shown) for controlling charging and discharging of the battery module 100, such as a battery management system (BMS), a current sensor, a fuse, and the like.

Meanwhile, an electronic device (not shown) according to an embodiment of the present disclosure includes at least one battery modules 100 as above. The electronic device may further include a device housing (not shown) having an accommodation space for accommodating the battery pack, and a display unit through which a user may check the state of charge of the battery pack.

In addition, the battery pack according to an embodiment of the present disclosure may be included in a vehicle such as an electric vehicle or a hybrid electric vehicle. That is, the vehicle according to an embodiment of the present disclosure may have the battery pack according to an embodiment of the present disclosure described above inside a vehicle body.

Meanwhile, the terms indicating directions as used herein such as upper, lower, left, right, front and rear are used for convenience of description only, and it is obvious to those skilled in the art that the term may change depending on the position of the stated element or an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 100: battery module | 110: cell assembly |
| 111: secondary battery | |
| 122: lower case | 124: upper case |
| 126: upper cover | S1, S2: accommodation space, buffer space |
| H1, H2, H3, H4, H5: connection hole, discharge hole, first bolt hole, second bolt hole, third bolt hole | |
| B: bolt | |
| 130: partition member | |
| 131, 132, 133: first barrier unit, second barrier unit, third barrier unit | |
| 134: hinge-coupling structure | S3, S4: first coupling space, second coupling space |
| G1, G2, G3: insert groove, mounting groove, fixing groove, | |
| P: fixing protrusion | L: height |
| 140, 142: bus bar assembly, bus bar frame | |

What is claimed is:

1. A battery module, comprising:
a cell assembly having a plurality of secondary batteries;
a lower case having an open top and having an accommodation space in which the cell assembly is accommodated;
an upper case coupled to the lower case to cover the open top of the lower case and having a connection hole communicating with the accommodation space;
an upper cover coupled to the upper case to cover an upper portion of the upper case and configured to form a buffer space with the upper case, the upper cover having a discharge hole so that the buffer space communicates with the outside; and
at least one partition member extending in a horizontal direction inside the buffer space to form a moving passage extending from the connection hole to the discharge hole, the at least one partition member configured to have an adjustable extension length,
wherein the at least one partition member includes at least two barriers configured to be disposed to overlap with each other or be partially separated from each other and extending in a horizontal direction, and
wherein ends of the at least two barriers are hinged with each other, and at least one of the at least two barriers has a coupling space formed to accommodate another barrier.

2. The battery module according to claim 1, wherein the at least one partition member includes:
a first barrier having two sides extending in the horizontal direction and spaced apart from each other by a predetermined distance so that extended ends of the two sides are connected with each other, and a first coupling space formed between the two sides and opened in upper and lower directions;
a second barrier having an extended end hinged to an end of the first barrier and configured to be inserted into the first coupling space between the sides of the first barrier by hinge rotation, the second barrier having a second coupling space formed to accommodate another barrier; and
a third barrier having an extended end hinged to an end of the second barrier and configured to be inserted into the second coupling space between the two sides of the second barrier by hinge rotation.

3. The battery module according to claim 2, wherein at least one of the upper cover and the upper case has an insert groove configured so that the extended ends of the first barrier are inserted therein.

4. The battery module according to claim 1, wherein the at least one partition member has a fixing protrusion protruding upward or downward, and
wherein at least one of the upper cover and the upper case has a fixing groove configured so that the fixing protrusion is inserted therein.

5. The battery module according to claim 1, wherein at least one of the upper cover and the upper case has a mounting groove configured so that an upper portion or a lower portion of the at least one partition member is inserted therein.

6. The battery module according to claim 5, wherein the at least two barriers are configured to be exposed above the mounting groove by a same height.

7. The battery module according to claim 1, wherein at least two partition members are provided, and
wherein a first partition member among the at least two partition members is disposed to be biased toward a first side of the buffer space with respect to a center, and a second partition member among the at least two partition members is disposed to be biased toward a second side of the buffer space.

8. A battery pack, comprising at least one battery module according to claim 1.

9. A vehicle, comprising at least one battery pack according to claim 8.

10. The battery module according to claim 1, wherein at least one partition member has a first configuration with a first length and a second configuration with a second length greater than the first length, and
wherein in each of the first configuration and second configuration, the at least one partition member is straight.

11. A battery module, comprising:
a cell assembly having a plurality of secondary batteries;
a lower case having an open top and having an accommodation space in which the cell assembly is accommodated;
an upper case coupled to the lower case to cover the open top of the lower case and having a connection hole communicating with the accommodation space;
an upper cover coupled to the upper case to cover an upper portion of the upper case and configured to form a buffer space with the upper case, the upper cover having a discharge hole so that the buffer space communicates with the outside; and
at least one partition member extending in a horizontal direction inside the buffer space to form a moving passage extending from the connection hole to the discharge hole, the at least one partition member configured to have an adjustable extension length,
wherein the lower case and upper case are stacked in a vertical direction, and
wherein the at least one partition member comprises at least two barriers rotatable around a horizontal axis.

12. A battery module, comprising:
a cell assembly having a plurality of secondary batteries;
a lower case having an open top and having an accommodation space in which the cell assembly is accommodated;
an upper case coupled to the lower case to cover the open top of the lower case and having a connection hole communicating with the accommodation space;
an upper cover coupled to the upper case to cover an upper portion of the upper case and configured to form a buffer space with the upper case, the upper cover having a discharge hole so that the buffer space communicates with the outside; and
at least one partition member extending in a horizontal direction inside the buffer space to form a moving passage extending from the connection hole to the discharge hole, the at least one partition member configured to have an adjustable extension length,
wherein the at least one partition member comprises includes a first barrier and a second barrier, and
wherein the second barrier fits within the first barrier when in a folded state.

13. The battery module according to claim 12, wherein the at least one partition member further comprises a third barrier, and
wherein the third barrier fits within the second barrier when in a folded state.

* * * * *